Patented Oct. 13, 1925.

1,556,696

UNITED STATES PATENT OFFICE.

PAUL W. KRUGER, OF BOYETT, MISSISSIPPI.

DENTAL FILLING MATERIAL.

No Drawing.   Application filed February 6, 1925.   Serial No. 7,406.

*To all whom it may concern:*

Be it known that I, PAUL W. KRUGER, a citizen of the United States, residing at Boyett, in the county of Attala and State of Mississippi, have invented an Improvement in Dental Filling Materials, of which the following is a specification in such full, clear, concise, and exact terms as to enable any person skilled in the art or science to which the invention or discovery appertains, or with which it is most nearly connected, to make, construct, compound and use the same.

This application describes one of the inventions which was described in application, Serial Number 486,809, of this same applicant, filed July 22, 1921, and relates to dental cements embracing guaiacol. This application herein, concerns particularly that part referring to the guaiacol cements and is a continuation in part of the said application, Ser. No. 486,809. Other invention described in said application, Ser. No. 486,809 as relates to cements set with eugenol, is the subject of separate application, Ser. No. 721,139, filed July 19, 1924, entitled "Improvement in dental filling materials" which is also a continuation in part of application, Ser. No. 486,809, filed July 22, 1921.

My invention relates to improvements in dental cements and is new in the use of guaiacol as the cement fluid for setting cements and as the setting agent in the liquid of dental cement powders that react with guaiacol to form a hardened mass and is new in the use of guaiacol in conjuction with magnesium cement powders to form hardened cements with guaiacol contained in the cement liquid acting as the setting agent, and is new in guaiacol being used as an only setting liquid of magnesium cement powders, or as a setting agent in the cement setting fluid which contains it, or as a part setting liquid in conjunction with other liquid, or as a setting liquid in conjunction with eugenol or other appropriate setting liquid; and my invention is new in the use of calcined magnesium compounds used as a part or wholly to constitute cement powders in conjunction with guaiacol as a setting liquid as above stated.

An object of my invention is to avoid the use of mineral acids or detrimental or irritating or injurious setting liquids in dental cements that are made by mixing a dental cement powder and a liquid, to form a hardened mass. An object is to use an anesthetic, germicidal liquid. Guaiacol has anesthetic properties and is a good germicide. An object is to provide directly from the setting liquid, a contributing, active germicidal action during the time that the cement is setting in the tooth cavity or during the time that the powder and liquid have not yet entirely reacted into thorough combination and an object is to contribute a germicidal or antiseptic action directly from the setting liquid thereafter by the use of guaiacol as the setting liquid of cement powders suitable for dental uses, that react with guaiacol, and particularly magnesium cement powders and result in bactericidally active guaiacol combinations of hardened cement form. Cements set with phosphoric acid ordinarily do not have a bactericidal activity contributed by the setting action of the acid on the cementitious ingredient of the powder. Guaiacol cements and guaiacol magnesium cements particularly, have a nicely working quality in their plastic, mixed condition for working, are readily applied or readily drop off from the tool into place in a tooth cavity and form cements of intimate contact. Phosphoric acid cements have a strong tendency to follow the tool and pull away in placing the mixed material which soon becomes doughy while it hardens and consequently requires pressure in placing. Guaiacol magnesium cements in their plastic condition, and guaiacol mixed with calcined magnesium compounds in suitable consistency for plastic, creamy condition to work, are admirable cements to place without pressure or force in small channels and not having the tendency to draw away are consequently placed with more certainty of completely filling a terminal of a channel or root-canal. The production of a cement of admirable working ease for the dentist is an object. Guaiacol magnesium cements are adapted for use where there is close proximity or contact with tooth pulp whether that be for mere exposures, or part way in the root-canal or at the very end of a root-canal as in closing a foramen and capping the pulp tissue that may be left in that foraminal channel or in the foramina, after pulp removal from the main part of the root-canal, as may occur in removal under anesthesia.

My cement is described and is of a type as follows:

A cement to set and harden consists of a powder and a liquid or combination of two substances which, brought together, set into a hardened or firm mass. Either guaiacol or eugenol in contact with magnesium oxide, in a mix, will harden into a solid mass and will also combine with magnesium oxychloride cement powder as calcined from magnesium chloride, as well as with magnesium oxide or with a combination of these, and harden with greater rapidity.

It is not necessary that the cement be constituted entirely of a material with which the setting liquid may chemically unite. I find it also of advantage to incorporate an inert or insoluble material suitable for dental uses, or substances suitable for dental uses as a part of or as a foundation with which to incorporate the cement materials to act as a binder using no more of the cementing ingredients than is necessary to fill the interstices of the inert material or more than coat the material sufficiently for firmly setting and solidly binding. A cement powder mainly composed of an inert material such as kaolin, fuller's earth, infusorial earth or other suitable, inert or insoluble substance, will require just as much guaiacol (approximately or nearly so) to be mixed with it, to arrive at a workable cement paste for prompt use before appreciable thickening due to reaction, has taken place but the solid cementing ingredient or calcined magnesium material or magnesium oxide present in smaller quantity, will be combined to a greater extent with the setting liquid in hardening of the cement, as the liquid cannot combine with the inert or insoluble substance, and is taken up in combination with the calcined magnesium compound, or with the magnesium oxide which has a relatively large combining power in relation to the amount of liquid necessary to mix with the cement powder to arrive at a paste of suitable consistency to apply.

By the word "inert" in this specification is meant chemically inert in reference to the ingredients of the cement. In its limits the word "inert" is meant to embrace substances or bulk materials or powders suitable for dental uses, that in presence of the cement setting liquid and the cement binding powder mixed together for cement proportions, do not react actively, chemically, detrimentally to cement formation. Restrictions are not made as to inert in a physiological sense as any substances appropriate for dental uses, or that are relatively inert as here defined, or conform to the definition of the word "inert" as set forth, may be used in place of some of the cementitious, solid ingredients, to the extent of avoiding or displacing needless excess of cementing ingredient or binding material or of calcined magnesium compound or of magnesium oxide in forming a cement within the limits of retaining useful hardness. Substances that do not withstand heat of calcining temperature, I mix directly with the cement powder. Substances incorporated may be medicinal, antiseptic, astringent (tannin or an albumin coagulating substance may be incorporated directly with the cement powder), or bactericidal substance used, and radiopaque substances are embraced within the definition given above.

When the words "solubility" or "insolubility" or "insoluble" occur in this specification or in the claims of this specification, which follow, the meaning is solubility or insolubility, as the case may be, in reference to water. In their limits the words "insolubility" mean a relatively high degree of insolubility in contact with water.

I find that magnesium oxide of U. S. P. quality either the light or the heavy, and preferably free from water and $CO_2$, will make suitable cements when these powders are mixed with guaiacol or with a cement liquid in which guaiacol is the setting agent, when liquid and powder are mixed into a plastic condition to form a paste of suitable consistency and allowed to harden, and these are useful for root-canal work as well as these and other calcined magnesium compounds produced by similar or other methods.

I find by experimental trials that to make a cement of firmness and hardness and some rapidity of setting, there must be sufficient magnesium oxide or sufficient of a calcined magnesium compound, incorporated to make a binding material approximately sufficient to fill the interstices of the inert powder. Using in part calcined oxychloride of magnesium or a calcined magnesium compound, of a form calcined from magnesium chloride, as herein appears, in place of magnesium oxide, or a mixture or combination of magnesium oxide and oxychloride produced by calcining, enhances or is inclined to enhance the speed of setting. A favorable temperature for calcining magnesium compounds for cement use for producing calcined magnesium compounds that constitute cement powders that set into a hardened mass with guaiacol when mixed with such powders in suitable proportions to give a plastic condition, is around 400 degrees C. or from 300 to 500 degrees C. In case of calcining magnesium chloride, the compound formed is a calcined magnesium compound and is a calcined magnesium compound having magnesium oxide, in its composition and it need not be wholly MgO. Such a calcined compound of magnesium constitutes a cement powder as well as any calcined compounds of magnesium that are solely MgO, when mixed in appropriate quantities with guaiacol or with a liquid in which guaiacol is the setting agent, into a plastic condition to react with guaiacol to harden with it, and the calcined magnesium compounds mixed with inert or insoluble powders in suitable proportions to hold them together, as a binding agent, also constitute magnesium cement powders suitable to react with guaiacol for producing hardened cements. When hardness is particularly desired in the set cement and the calcining temperature necessary for preparation of a calcined magnesium compound as the cement binding agent, is permissible to use with an inert substance with it, I can use as an inert or insoluble ingredient, one that will appropriately withstand heat.

As a specific instance, I can use for an inert substance, by choice, kaolin as a soft, white, inert, insoluble material. To use a calcined magnesium compound or magnesium oxide in loose mixture with this does not produce as firm a cement or quick setting cement, in a mix of the cement powder with guaiacol, as direct attachment of the magnesium compound or magnesium salt to the kaolin particles. For a hardest cement I calcine the oxide directly on the kaolin from the soluble salt of magnesium or produce the oxychloride of magnesium as calcined, as a calcined magnesium compound, having magnesium oxide, in its composition, directly deposited on the particles of kaolin by calcining the magnesium chloride into the oxide and magnesium chloride combined form or oxychloride form herein designated, being a calcined magnesium compound, or by a combination of these methods, any of which will produce a better and firmer cement than a mixture of the cementitious binding agent and inert or insoluble substance, as wholly mixed in the cold, to set with guaiacol. Other suitable magnesium salts may be calcined together with the kaolin or inert or insoluble substance, or a soluble and insoluble salt of magnesium with the kaolin such as magnesium chloride and magnesium carbonate, and all of these constitute magnesium cement powders containing a calcined magnesium compound, that sets with guaiacol when brought into plastic consistency in mixture with these powders to react with guaiacol to form a hardened mass. A combination of these various modifications of cement powder is not incompatible in mixture in conjunction with the setting liquid, or guaiacol, to make a suitable cement. Powders of calcined magnesium compounds without inert or extraneous substances present in mixture with guaiacol or as setting agent, likewise produce hardening cements. The above and what follows state convenient ways of preparation by calcining in either case.

For a specific instance of cement making, the kaolin (or inert or insoluble substance, or substances, that withstand heat equivalent to the heat required of a calcined magnesium compound in production of magnesium cement powders) I mix with a solution in water of magnesium chloride or with a solution of a soluble magnesium salt which will form the oxide in calcining, or with an insoluble magnesium salt mixed with a soluble magnesium salt, or mix the kaolin with a combination of these or with magnesium chloride and magnesium nitrate in solution with water and evaporate and calcine together. Temperature of preparing calcined magnesium compounds is a matter known in science and chemistry. Calcined magnesium compounds to form magnesium cement powders that react with guaiacol to form hardened cements, may be made at temperatures around 300 to 500 degrees centigrade. The resulting mass is then ground into powder. In this way the kaolin, (or inert or insoluble or ingredient powder) is coated with adherent magnesium oxide or oxychloride or a combination of them or with a calcined magnesium compound). The powder when mixed with guaiacol or eugenol or other suitable combining germicidal compound having setting reaction with the magnesium compound, forms a cement of much hardness and suitable setting rapidity. Both eugenol and guaiacol are bactericidal and permissible to use in every proportion of the two liquids mixed as giving with the powder hard, firm cements, as well as the use of guaiacol alone as the setting agent in a cement liquid.

The proportion of inert powder or inert or insoluble substances to use in the cement powder is a matter of choice within the limits of being a function of the combining power of the binding cementitious powder or of the magnesium cement binding ingredient or of the calcined magnesium compound of the cement powder, or of the combining power of MgO with the guaiacol, and in order to always have an excess of combining cementitious ingredient, preferably ten percent excess, or more, of dry cement binding material or of the calcined magnesium compound, is desirable, and in limitation the minimum quantity to use may be arrived at according to the coarseness and the kind of powder, as a simple, approximate matter of volume of the intersticial spaces of the inert or insoluble powder. When using kaolin alone, sixty-five parts kaolin may be used with thirty-five parts calcined magnesium compound, or when magnesium oxide is the only binding agent, a like quantity of magnesium oxide is used for very good cements, or if the materials are calcined together, a corresponding proportion of magnesium salt to produce the desired amount of magnesium oxide or of calcined magnesium compound acting as a binding cementitious ingredient, is a simple matter of calculation by molecular weights. Any less amount of inert or insoluble ingredients is of course permissible and on the other hand good cements may be obtained with somewhat less MgO present if the materials are calcined.

In addition to the above I also set other powders with guaiacol or with guaiacol as the setting agent or with a setting liquid in which there is guaiacol that essentially sets the cement. My invention embraces other powders that set with guaiacol. Among such cement powders may be mentioned barium hydroxide which will set alone with guaiacol but in being so fast and spontaneous in action in mixture alone with guaiacol in concentration, it is better adapted to be used as a powder incorporated with other or slower powders or with a powder having a considerable proportion of inert or non-binding substances up to seventy percent. Calcium oxide powder alone also sets into a hard cement with guaiacol or in a liquid in which guaiacol acts as a setting agent, but it has not the radiopacity of barium compounds.

Guaiacol also sets gradually with bismuth trioxide, anhydrous, and this alone with guaiacol or guaiacol as the setting agent constitutes a dental cement. Bismuth trioxide as a substance of cementing property in a cement or as a cement powder alone with guaiacol, is mainly appropriately used for root-canal work in case immediate time for setting is not required and quick setting is sometimes of less importance. It does not get quite so hard or set as rapidly as magnesium cements set with guaiacol but it has value as a bactericidal substance of density that sets with guaiacol into a good dental cement. Bismuth trioxide as an antiseptic substance can also be used in magnesium cement powders, incorporated in any proportion for slow setting cements to set with gaiacol or with a setting liquid in which guaiacol is the agent of setting. Zinc hydroxide formed by precipitation and air dried at atmospheric temperature or preferably not above one hundred degrees centigrade, I find, also has a setting action with guaiacol and constitutes a cement therewith.

The proportions of ingredient powder or inert powder that may be added or incorporated with the various cementitious binding powders to retain good cementitious properties for firm cement formation, are also within the same limits as with the magnesium powders. For slow setting powders the amount of solid cementitious binding ingredient may be increased advantageously to avoid too slow setting of powder and setting liquid mixed for hardening cement formation. The inert substances as herein defined should usually be not more than sixty or seventy percent of the total weight of the cement powder. Antiseptic substances I use in the dental cements, are bismuth compounds, one of which is mentioned above, also bismuth subcarbonate, and I use mercury compounds, mercuric salicylate, the mercury oxides and especially mercuric oxide. I have also used soluble zinc salts. These matters in part are subject of other application or applications for Letters Patent. In incorporating non-binding, antiseptic substances as part of the cement, these non-cementitious, antiseptic substances are regarded as a part of the "inert" ingredients of the cement. The amount of mercury compounds I introduce is usually about one to six per cent of the weight of the total powder (cementitious dry substance or substances and inert substance or substances together) and these antiseptic substances are taken in the smaller proportions according to the activity, physiologically, of the mercury compound. Mercuric oxide I generally use in one percent content in root-canal cements and about the same percentage of other mercuric compounds when using other insoluble or nearly insoluble mercuric compounds. The mercurous compounds I use in larger percentage content up to six per cent but more can be used.

The magnesium cement powders are inclined to make the smoothest working cements.

To obtain a good mix of the cement powders with the setting liquid or with the guaiacol to form good hardened cements, observation of consistency of the mix is the usual manner, adding enough liquid gradually in spatulating, which is usually done on a smooth slab by working the materials together with a dental spatula, until a plastic consistency or a thick creamy consistence of cement mix is obtained, suitable to put into a tooth cavity. It is not necessary to weigh the quantities of powder and combining liquid. The powder and setting liquid being mixed together in a simple way by spatulating together, exact proportions are not essential for convenience to mix for excellent cements but one part guaiacol or of setting liquid to one or two parts cement powder, approximately by volume or weight, will be found the usual range of proportions for the working consistency.

Having thus described my invention and the advantages of the use of guaiacol as the setting agent of various cement powders suitable for dental uses, that set with guiacol, and disclosed guaiacol as being particularly useful in a setting liquid in setting calcined magnesium compounds or cement powders that contain a calcined magnesium com- pound, which in plastic mixture with guaiacol constitute cements of favorable properties and desirable working qualities for dental uses, I claim:

1. A dental cement composition consisting of a cement powder and guaiacol which is the setting agent for said powder.

2. A dental cement composition consisting of a cement powder and a liquid in which guaiacol is the setting agent having setting reaction with said powder in forming a hardened mass.

3. In dental cements that comprise a powder that can be set into a hardened mass with guaiacol, a setting liquid in which guaiacol is the setting agent that in reacting with a solid cementitious constituent of the said powder, forms a hardened mass with a cementitious powder and an inert powder incorporated together, the word "inert" being as defined in this specification.

4. In dental cements that comprise a powder that can be set into a hardened mass with guaiacol, guaiacol as the liquid that is chemically reacting with a cementitious solid constituent of the said powder forms a hardened mass together with an embraced inert powder, as the word "inert" is defined in this specification.

5. In dental cements, guaiacol as the agent of setting of cement powders that have setting reaction with guaiacol, said powders consisting of an inert powder, as the word "inert" is defined in this specification, and a cementitious solid ingredient therein.

6. A dental cement comprising a magnesium cement powder and guaiacol as the setting liquid having setting reaction with the cement powder to harden with it.

7. A dental cement comprising a magnesium cement powder containing magnesium oxide in its composition, and a liquid containing guaiacol that is the setting agent of the cement powder.

8. A dental cement comprising a powder suitable for dental uses, that contains magnesium oxide as the solid binding ingredient of the cement, and a liquid in which guaiacol is a setting agent that reacts with the cement powder in hardening with the powder.

9. A dental cement comprising a powder suitable for dental uses, which comprises in its composition magnesium oxide and an inert powder as defined in this specification, and a setting liquid which is guaiacol.

10. A dental cement comprising a powder suitable for dental uses, which comprises kaolin and magnesium oxide, and a liquid in which guaiacol is a setting agent that reacts with the powder to harden with it.

Signed at Boyett in the county of Attala and State of Mississippi this 14th day of January, 1925.

PAUL W. KRUGER.